United States Patent [19]
Wolf et al.

[11] Patent Number: 4,479,638
[45] Date of Patent: Oct. 30, 1984

[54] SPRING DEVICE

[75] Inventors: Franz J. Wolf, Bad Soden-Salmünster; Hubert Pletsch, Birkenau, both of Fed. Rep. of Germany

[73] Assignee: WOCO Franz-Josef Wolf & Co., Bad Soden-Salmünster, Fed. Rep. of Germany

[21] Appl. No.: 389,147

[22] Filed: Jun. 16, 1982

[30] Foreign Application Priority Data

Aug. 4, 1981 [DE] Fed. Rep. of Germany ....... 3130830

[51] Int. Cl.³ .............................................. F16F 9/19
[52] U.S. Cl. ............................................... 267/64.17
[58] Field of Search ............... 267/64.13, 64.17, 64.19, 267/64.27, 22 R, 140.1

[56] References Cited

U.S. PATENT DOCUMENTS

| | | | |
|---|---|---|---|
| 3,222,049 | 12/1965 | Tuczek | 267/64.17 |
| 4,342,446 | 8/1982 | Eaton et al. | 267/64.17 X |
| 4,392,639 | 7/1983 | Konishi | 267/140.1 |

*Primary Examiner*—Duane A. Reger
*Attorney, Agent, or Firm*—Jordan and Hamburg

[57] ABSTRACT

A self-activated and load-independent level regulating device for connection between two relatively movable parts includes a pump having a pump chamber and a piston. The pump chamber is connected to one of the parts and the piston, which is operable in the pump chamber, is engageable with the other of the parts such that the relative axial position of the piston in the pump chamber correspond to the relative position between the two parts. An elastically deformable spring chamber containing a hydraulic fluid is disposed between the two parts, and a supply chamber containing a hydraulic fluid supply is also disposed between the two parts. A first passageway is connected between the pump chamber and the supply chamber means, and a first control valve is disposed in the first passageway. A second passageway is connected between the pump chamber and the spring chamber, and a second control valve is disposed in the second passageway, whereby the pump is actuated upon relative movement between the two parts to effect a pumping action of pressure and suction pulses between the supply chamber and the spring chamber via the first and second passageways to thereby provide load-independent, level regulation between the two parts.

12 Claims, 8 Drawing Figures

SPRING DEVICE

BACKGROUND OF THE INVENTION

This invention relates to a self-activated, load-independent and level-regulating spring device.

For a long time there has been a continuous need in widely different fields of technology for reliable, inexpensive and technically uncomplicated self-activated, level-regulating spring devices. Such spring devices are needed especially, but in no way exclusively, in the automotive industry. The automotive industry requires such spring devices especially for wheel suspension and motor suspension. The costly construction of such self-activated, level-regulating spring devices has led to the result that such spring devices can only be used in isolated instances in vehicles of a high price range. In addition, the known spring devices have the disadvantage of not being unconditionally load-independent, unless their resiliency is controlled by a centralized control. This means that for each different type of vehicle, different spring devices have to be kept at disposal. This results in high storage and inventory costs not only for automotive manufacturers but also for car repair garages.

Motor suspension especially requires soft, that is, flat operational spring characteristics for the spring device to be used. The required spring device thus needs to make available large spring paths of travel for predetermined loads. In view of the resilient spring devices used nowadays, such spring devices need to have relatively large dimensions in order to fulfill the aforementioned requisites to ensure a reasonable life for the elastomer and to prevent overloading or overstressing of the elastomer during operation. However, at the same time, it is required that such spring devices have approximately the same spring resiliency with different loads, thus even with differing heavy drive mechanisms for substantially the same types of vehicles, accordingly, rubber-elastic spring devices should, with basically the same dimensions for different loads, have the same soft spring characteristics. This problem, in practice, nowadays, is solved by providing rubber spring devices with substantially the same dimensions, but in each case with differing hardnesses corresponding to the load, and which, for this reason, have widely differing spring characteristics. It can readily be seen that this practice requires not only expensive storage and inventory, but also opens up the possibility for numerous mixups and confusion. It has frequently happened that heavier motors have been supported on spring devices that were too soft or, vice versa, and that light motors have been suspended on spring devices that were too rigid.

In view of this state of the art, this invention has as an object to provide a self-activated and, above all, a load-independent, level-regulating spring device for any desired purpose, especially, however, for the automotive industry, and particularly for drive mechanisms and wheel suspensions, which, despite being provided with load-independent level regulation independent from load, has the same soft spring resiliency and defined spring paths as well as improved life, turns out in the long run, to be inexpensive as its higher price is more than compensated for when it is compared to simple rubber spring devices by the savings that result from lesser storage and inventory expenses and the lack of complaints.

To obtain this objective, this invention provides an automatic, load-independent, level-regulating spring device of the aforementioned type. The spring device of the present invention distinguishes itself, in substance, by a separation of the functions of cushioning and pumping. The entire cushioning or spring loading effect is taken over by a hydraulic spring chamber that is activated hydraulically by a pump which, in turn, does not fulfill any spring-loading function. The pump is not driven by outside energy sources, being rather activated through the relative motions between the two parts which move relative to each other, e.g. the parts that are to be spring-loaded or cushioned relative to each other. This type of drive of the pump chamber is acheived in that the pump chamber, that is, the displacement or compression chamber, is connected to one of the parts to be cushioned against each other, while the pump piston in each case is activated by the other part. Such activating may take on various forms, for example through an articulated piston rod, or may be a flexible connection, for instance a spring biased pump piston biased against a surface of the part to be impacted. Such a spring impacting of the pump piston, however, only serves the purpose to maintain the pump piston always biased on one of the two parts to be cushioned against each other and may not serve the purpose of shock absorption.

With this type of coupling of the pump between the two parts to be cushioned against each other, the relative position of the pump piston in the pump, that is, the displacement or compression chamber of the pump will always correspond to the distance of the two parts to be cushioned against each other, thus "reproducing" this distance according to the theory of the control system. Through the release of a bypass connection to the supply recipient of the hydraulic fluid above a predetermined limiting position, thus above a predetermined limiting distance of the two parts to be cushioned against each other, the opening of the bypass connection causes a decrease in pump pressure. The spring chamber thus is not impacted with pressure fluid any further and thus will not enlarge the distance of the two parts to be cushioned against each other. This distance will only be enlarged again, if, for instance, leakage arises on the pressure side of the hydraulic system that will reduce the distance of the two parts to be cushioned against each other.

It is of special advantage in practice if the whole pump is assembled inside the spring chamber itself. The whole system can thus be enclosed hermetically by the spring chamber. Especially in this case, according to one embodiment of the invention, the connecting channel and the second control valve are preferably formed in the pump piston itself in the case of a sliding piston pump and thus in the piston slider.

The spring device may be of radial or, yet, of axial construction. The concepts "radial" and "axial" refer to the main components of the forces to be acted upon and to be cushioned.

The advantage of the automatic, level-regulating spring device of the invention herein resides in the fact that the level regulation most of the time works load-independent to a large extent. Independently from the size of the load to be cushioned, the spring chamber will always be pumped up high enough to release the bypass connection to the supply chamber in the pump chamber. The spring device follows exactly defined spring paths. In other words, the spring device of the present invention makes it possible to achieve about the same spring action or behavior and identical level regulation with the same type of construction for differing loads.

Furthermore, since the spring chamber is supported by the pumping-up effect and unloaded by the springy material, it is possible to achieve long-life characteristics with the utilization of an elastomer as raw material for the cushioning of the spring chamber, which is independent from the so-called setting or behavior patterns and remains unaffected by fatigue of material and overstress of material which are frequently observed in traditional rubber spring devices.

The damping spring device, which can also be designated as a spring dampening device has the advantage that as the shocks or impacts grow stronger, the bearing is lifted with a greater amplitude of movement against the elastic stop, being hardened thereby, which causes the desired quieting down of the masses to be cushioned against the non-cushioned masses. Seen in its totality, the spring device of the present invention thus represents a hydraulically damped device.

In one embodiment in which the pump is, in essence, assembled in the supply chamber, a simplification is achieved by the fact that a single oblique or angular channel establishes a direct connection between the spring chamber and the damping chamber with the supply chamber. By the oval formation of the opening of the oblique channel leading to the supply chamber and the cross-sectional configuration of the oblique channel, throttling effects are achieved that permit a direct connection. By forming the pump piston with a larger cylinder diameter in the direction of the pump compartment and a smaller cylinder diameter in the direction of the rounded head area, it is possible to close off the direct connection to the spring chamber over the oval opening on an intake pulse so that the hydraulic fluid is drawn largely from the supply chamber alone. The type of construction of the pump in the supply chamber, however, also makes it possible to select a spring with lower spring action for impacting the pump piston, since post-guidance of the pump piston in the supply chamber is made easier. As the pump is assembled directly in the supply chamber, it will not be necessary to install a connecting passage in the form of a third connecting passage, which in the intermediate phase of lifting of the pump piston is used to establish a free connection between the pump compartment and the supply chamber.

The invention will now be explained in more detail by examples of embodiments with reference to the accompanying drawings.

DESCRIPTION OF THE PREFERRED EMBODIMENTS

Figure 1:
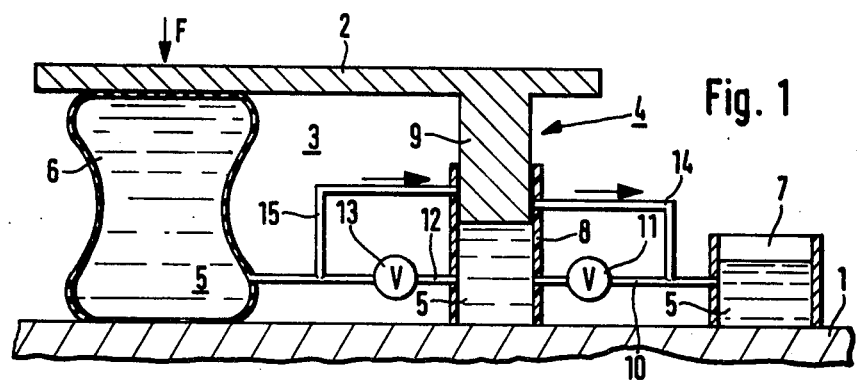
FIG. 1 is a block diagram and schematic representation illustrating the basic principle of the spring device of the present invention.

In the diagrammatic sketch according to FIG. 1, a first part 1 and a second part 2 which are movable relatively to each other in the direction of arrow F, are cushioned against each other by a spring device 3, that is, a spring damping device comprising, in essence a pump 4 for hydraulic working fluid 5, a spring chamber 6, which is completely filled with the hydraulic fluid, and a supply chamber 7. The hydraulic fluid is at least largely subjected to the environmental pressure in the supply chamber 7, being thus, at least seen from a perspective of the system, largely without pressure. By contrast in spring chamber 6, the hydraulic fluid 5 is under pressure, which pressure, in essence, is largely dependent on the acting load, e.g., force F that acts on the spring chamber. For instance, the over pressure of the hydraulic fluid 5 in spring chamber 6, for forces F to be cushioned in a size range from 0.3 to 2 kN, will typically lie in a range from approximately 1 to 10 bar. These data and results can, however, also be set in other ways by the expert without any difficulty depending on the objective to be achieved by the spring device. Such adjustment may, for example, be made by a selection of the material for the wall of spring chamber 6 as well as by corresponding formation of the spring chamber. An elastomer or a corrosion-proof spring material is preferably used to form the spring chamber 6, the corrosion-proof material also possibly being used in combination with the elastomer.

A pump member 8 of pump 4 schematically illustrated in FIG. 1 as a cylinder is rigidly connected to the first part 1. The pump piston 9 also is rigidly connected to the second part 2 in the schematically illustrated diagrammatic sketch of FIG. 1. Upon relative motion of the two parts 1 and 2 in the direction of arrow F, the pump piston 9 moves downwardly and upwardly in pump member 8. Thereby pump 4, on approaching of parts 1 and 2 to each other, carries out a pressure pulse and, on their moving away from each other, a suction pulse. The position of the piston 9 in pump member 8, meaning in the representation of FIG. 1 the lifting height of the piston 9 in the cylinder of pump 4, at all times, will unequivocally correspond to the distance between part 1 and part 2.

In particular, there is no need for pump piston 9 to be rigidly connected to the second part 2, as shown in FIG. 1. Rather, according to the invention, it is merely required that the position of pump piston 9 be unequivocably determined by the position of part 2. For this purpose, pump piston 9 may also be coupled in articulated fashion to part 2 or it may be biased by a spring element which keeps pump piston 9 permanently in contact or lying against a tripping or striking surface formed on part 2.

Pump 4 is connected through a first connecting passage 10 to the supply chamber 7. A first control valve 11 is provided in the first connecting passage 10 which opens on a suction pulse of pump 4 so that pump 4 draws in fluid 5 from the supply chamber 7 and closes upon a pressure pulse of pump 4.

Pump 4 is further connected to the spring chamber 6 through a second connecting passage 12. A second control valve 13 is provided in the second connecting passage 12 which opens on a pressure pulse and remains closed when pump 4 is in a resting position and also during the suction pulse of pump 4. On a pressure pulse of pump 4, hydraulic fluid 5 may be pumped from pump 4 through the second connecting passage 12 and the second control 13 against the fluid under pressure in spring chamber 6 into spring chamber 6.

The spring device 3 schematically illustrated in FIG. 1, according to the invention, furthermore comprises a third connecting passage 14 which freely connects pump 4 to supply chamber 7, when the opening, otherwise tightly closed by the pump piston 9 of pump 4, of the third connecting passage 14 leading to pump member 8 of pump piston 9 is uncovered or released. This release of the third connecting passage 14 occurs at a predetermined position of the pump piston 9 in the pump member 8 which corresponds to a predetermined distance of part 1 from part 2. Accordingly, on movement of parts 1 and 2 towards each other, e.g. introduction of pump piston 9 into pump member 8, the pressure fluid 5 is conducted, practically without resistance, over the third connecting passage 14, back into supply chamber 7, and sufficiently high pressure is no longer created in the second connecting passage 12 to open the second control valve 13. It is only when the two parts 1 and 2 cushioned against each other have again moved so close to each other that the pump piston 9 again closes the opening of the third connecting passage 14 in the pump member 8, on further movement of the parts 1 and 2 towards each other, that there is again produced a fluid pressure in the second connecting passage 12 through the movement of the pump piston 9 which opens control valve 13 so that again the fluid 5 under overpressure is forced into the spring chamber 6. Thereby the spring action of spring chamber 6 that acts counter to force F is enlarged, thus also increasing the distance of parts 1 and 2 from each other. Thereby, again, pump piston 9 in pump member 8 is lifted, and this for as long as the third connecting passage 14 is again released. In this manner, the spring device 3 that is schematically illustrated in FIG. 1 operates automatically to effect level-regulating, independently of the size of the acting load or force F. Furthermore, it can easily be seen that the over-pressure of the working fluid 5 produced by the larger forces F in spring chamber 6 is larger than for smaller loads of spring device 3, thus with smaller acting forces F. In other words, the automatic, self-regulating spring device 3, will display at least approximate spring rigidity characteristics at differing loads, meaning an increase of the spring operating line or range.

The type of spring device 3 illustrated in FIG. 1 includes a fourth connecting channel 15, which freely connects the pump member 8 of pump 4 to the spring chamber 6 when the opening of the fourth connecting passage 15 to the pump member 8 that is otherwise tightly closed by the pump piston 9 of pump 4 is released upon a predetermined position of the pump piston 9 in the pump member; namely, only after the release or at least beginning of the release of the opening of the third connecting passage 14 to the pump member 8 by pump body 9. This has been indicated schematically in FIG. 1 in that the fourth connecting passage 15 leads into the pump member 8 of pump 4 a little above the third connecting passage 14.

Figure 2:
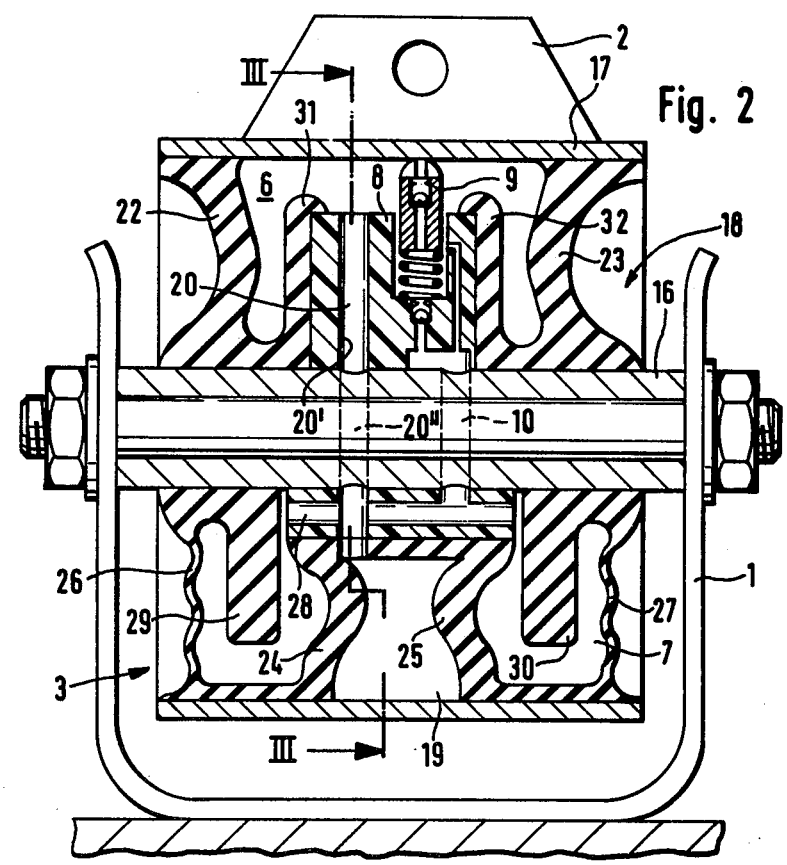
FIG. 2 is an axial cross section of a spring device according to one embodiment of the invention.
Figure 3:
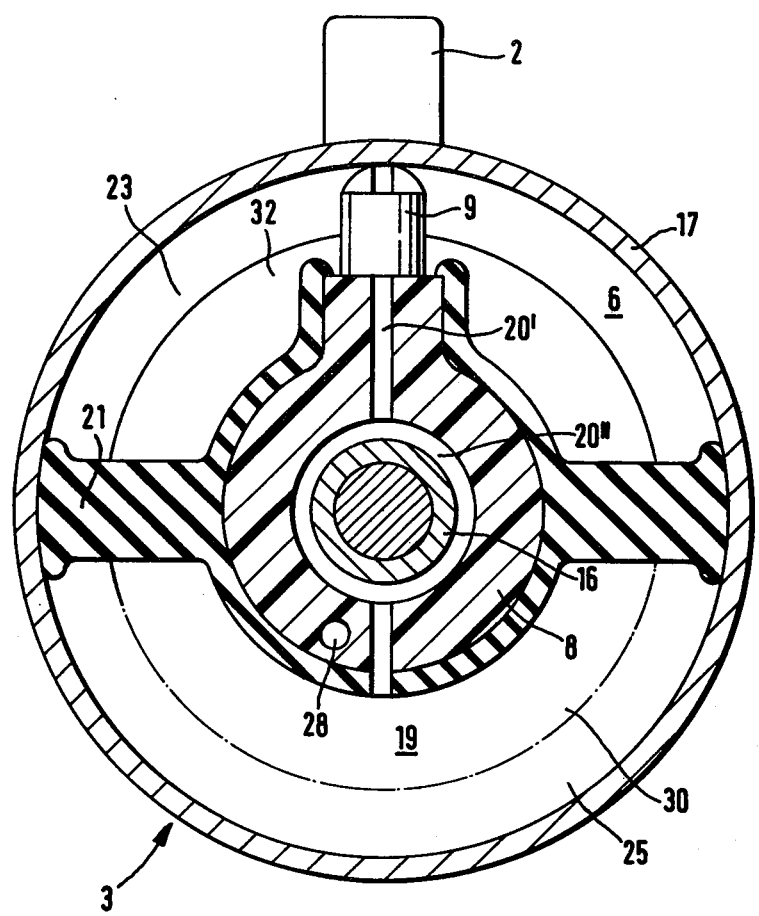
FIG. 3 is a sectional view taken along the line III—III in FIG. 2.
Figure 4:
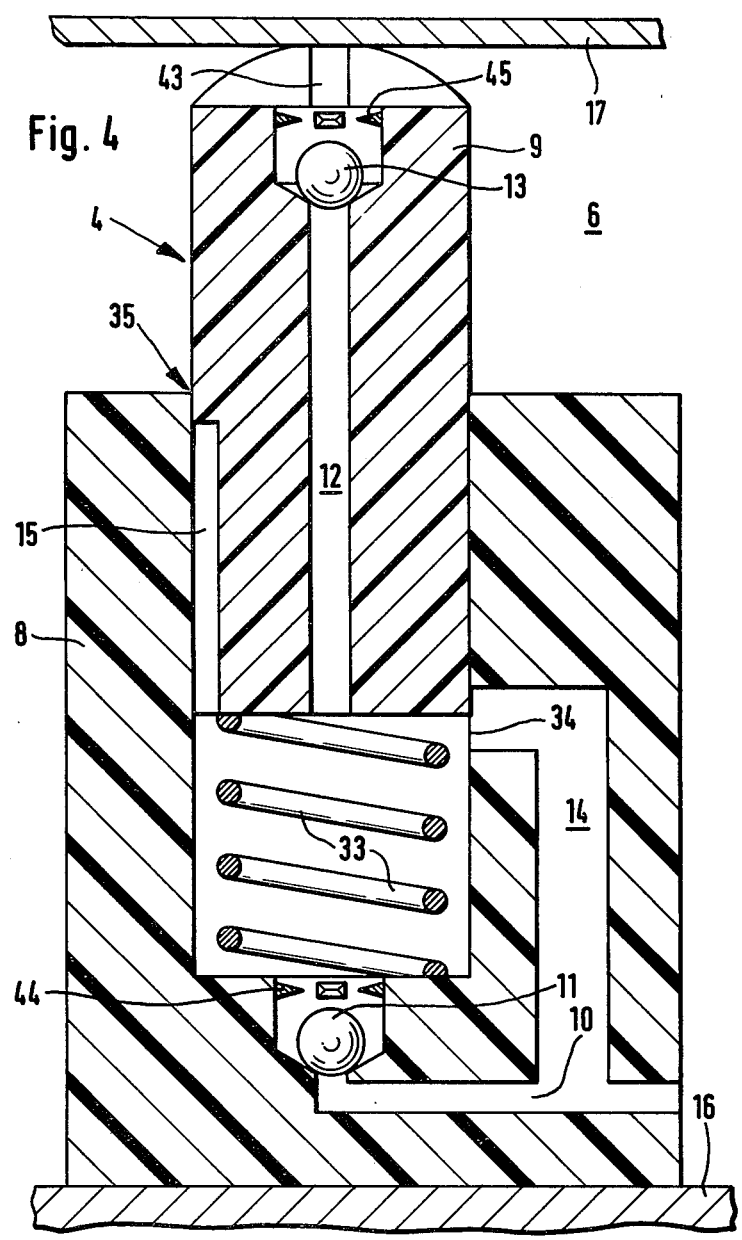
FIG. 4 is a sectional view of the pump shown in FIG. 2 but on an enlarged scale.

FIGS. 2, 3 and 4 are a schematic representation of a first embodiment of the present invention. For better understanding, the same reference numerals have been used for the same functional elements as in the designations in FIG. 1.

The spring device 3 shown in FIG. 2 comprises, in essence, an inner steel adaptor or sleeve 16 to which the first part 1, for example the chassis of a motor vehicle, is rigidly connected, an outer steel adaptor or sleeve 17 to which the second part 2, for example the motor block carrier of a motor vehicle, is rigidly connected, and an elastomer insert 18 assembled between the inner steel sleeve 16 the outer steel sleeve 17. A spring chamber 6, a supply chamber 7 and a damping chamber 19 are formed in the elastomer insert 18. The spring chamber 6 and the damping chamber 19 are connected to each other by a throttling channel 20 which is partly formed as a passage 20' in pump member 8 and partly as a ring 20'' in the inner steel sleeve 16. The spring chamber 6 and the damping chamber 19 are separated from each other by a horizontal separating wall 21 (FIG. 3). The outer wall of spring chamber 6, considered in the radial direction, as also the outer wall of damping chamber 19, considered in a radial direction, are formed by the inner wall of the outer steel sleeve 17. For this reason, the elastomer insert 18 is connected in a pressure-tight manner to the inside wall of steel sleeve 17, for instance through tensioning, glueing and/or vulcanization. The wall surface of steel sleeve 17 which limits spring chamber 6 is substantially larger, preferably larger by a factor of from 2 to 10, than the wall surface of the same outer steel sleeve 17 which limits the damping chamber 19. Thereby, despite free communication of the spring chamber 6 with the damping chamber 19 through the throttling chamber 20, the level-regulating lifting capacity of the spring device 3 has been retained.

While spring chamber 6 is provided with rigid, reinforced and elastic membrane walls 22,23 and the damping chamber 19 with comparable strong or only slightly weaker membrane walls 24,25 from the elastomer of the elastomer insert 18, the supply chamber 7 is limited by only relatively thin membrane walls 26,27 that can be deformed practically without resistance. Supply chamber 7 is arranged axially to both sides of the damping chamber 19. The two parts of supply chamber 7 are in free communication with each other through a connecting passage 28 that is formed as a passage in pump member 8.

Buffers or trips 29,30 are furthermore formed in the elastomer insert 18 which limit the return movement as also the buffers or trips 31,32 which limit the forward movement of the spring device and, and on doing so, fulfill the function of stops as well as the function of a load-taking resistance bearing on a pressure loss in spring chamber 6.

The pump member 8 consists of an artificial material or a light metal, for instance a pressure casting, and is shrunk by heat onto the inner steel sleeve 16. In the embodiment illustrated in FIG. 2, the first connecting passage 10 is partly formed as an annular groove in the inner steel sleeve 16 and partly as a passage in pump member 8.

In FIG. 4 pump 4 is shown in enlarged schematic representation. Pump 4 is formed as a sliding piston pump. The pump piston 9 of pump 4 which forms a throttling body is urged upwardly by a compression spring 33 as shown in FIG. 4 and is thus maintained in contact on the inside wall of the outer steel sleeve 17.

Pump piston 9 is provided with a traversing passage open on both sides that forms the second connecting passage 12. A second control valve 13 is formed as a ball or check valve in the second connecting passage 12, the pressure line of the pump. Herein the ball valve may be formed purely as a gravitational valve, a spring-biased valve, or in any other way.

A cross slit 43 in the head of pump piston 9 provides free fluid connection between the second connecting passage 12 and the spring chamber 6.

Also a first control valve 11 in the first connecting passage 10 forming the suction line of the pump is formed as a ball or check valve. The third connecting passage 14 is formed as a passage in the pump member as shown in FIG. 4. Finally, the fourth connecting passage 15 is formed as a channel in the pump piston 9 which on normal operation is closed by the pump member 8 opposite the spring chamber 6.

FIG. 4 shows one position of the pump piston 9 in pump compartment 8 in which the opening 34 of the third connecting passage 14 has just been released, while opening 35 of the fourth connecting passage 15, the security channel, is still closed. When a sudden operation of the spring device causes a rapid pressing down of the pump piston 9 in pump member 8, then a further pumping up of spring chamber 6 can be achieved through a rapid closing of opening 34 of the third connecting passage 14 and flow through the second connecting passage 12 and the second control valve 13. In the back-setting process, the pump piston 9 in the pump member 8 is, however, lifted so far that it will release the fourth connecting passage 15, namely the cut out formed in pump piston 9 with its upper edge, this the opening 35. Thereby the fluid under over-pressure from the spring chamber 6 can flow freely through opening 35 through the fourth connecting passage 15 through pump member 8 and through the third connecting passage 14 back to the supply chamber 7. Such backflow will occur until there is a decline of the charged outer steel sleeve 17, and thereby a pressing down of the pump piston 9 in the pump member 8, which will then again close opening 35.

Figure 5:
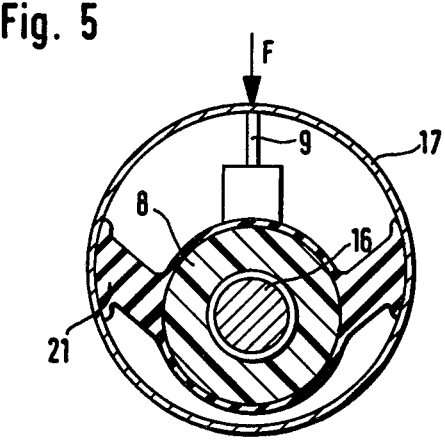
FIG. 5 is a schematic cross sectional view taken along a cutting plane similar to FIG. 3 but showing an alternate embodiment.

In FIG. 3 the inner steel sleeve 16 and the outer steel sleeve 17 are arranged concentrically to each other when the spring device is not charged or is not being stressed. A modified example of an alternative embodiment is illustrated schematically in FIG. 5. In the unstressed state, the inner steel sleeve 16 and the outer steel sleeve 17 are not arranged coaxially to each other. The coaxial position is obtained only then when a deflecting force F acts on the outer steel sleeve 17, while the inner steel sleeve 16 is firmly supported in place. In this way during a nominal or resting force applied to spring device 3, the coupling parts in the spring device that are slidable against each other, namely the steel sleeves 16 and 17, lie in a substantial coaxial relationship with each other. If, however, as shown in the example of the embodiment of FIG. 3, the outer steel sleeve 17 is charged or forced in a downward direction with the stationary steel sleeve 16 supported in place, then the axis of the inner steel sleeve 16 is relatively moved upwardly into a resting position opposite the axis of the outer steel sleeve 17. Such a displacement of the "zero line" of the spring device can be prevented by the pretensioned displacement of the axes of sleeves 16 and 17 relative to each other as shown in FIG. 5.

Figure 6:
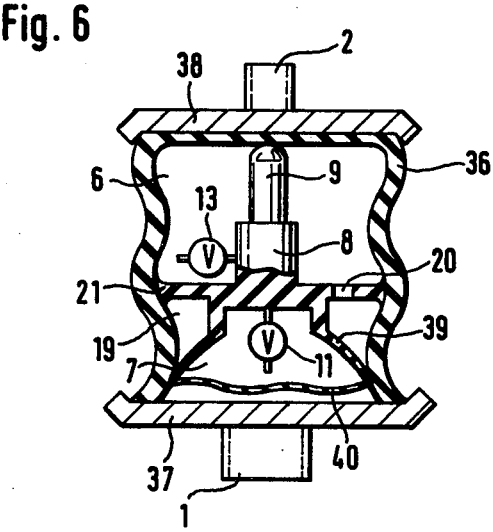
FIG. 6 is a schematic vertical axial cross sectional view of another embodiment of the spring device.

Another embodiment of the invention, is represented schematically in FIG. 6. While the spring element shown in FIG. 2 may be designated as a "radial bearing", the spring element shown in FIG. 6, by virtue of its formation, may be designated as an "axial bearing". Part 1, for example the chassis of a motor vehicle, is secured on a bottom steel element 37 secured to a rubber bellows 36, while in Part 2, for instance the motor block of a motor vehicle, is secured on an upper steel element 38, which is secured in the upper portion of a rubber bellows 36. The pump member is supported on the bottom element 37 of spring device 3 through a dome 39 having a semi-hemispherical configuration. A supply chamber 7, limited by a slightly deformable membrane 40, is formed under this dome. The pump member 8, the separating wall 21 and the dome 39 form a unit of steel, light metal or artificial material. A throttling passage 20 is formed in separating wall 11 which separates spring chamber 6 from a smaller spring chamber 19. Otherwise, the embodiment of the spring device shown in FIG. 6 operates in the same way as described above in connection with the other embodiments.

Figure 7:
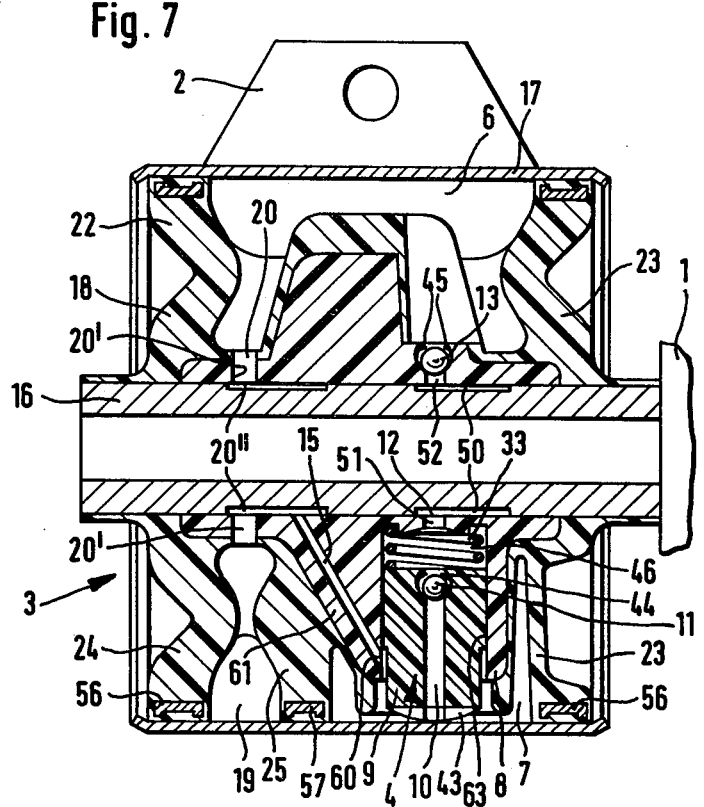
FIG. 7 is an axial cross sectional view of another alternate embodiment of a spring deivce with the pump assembled in the supply chamber.

FIG. 7 shows another embodiment of the load-independent, level-regulating spring device which is formed in a similar way as the spring device of FIG. 2. This embodiment uses the same reference numerals for the various parts as the spring device describes heretofore.

In FIG. 7, the arrangement of spring device 3 corresponds to that illustrated in FIG. 2 wherein the outer steel sleeve 17 is rigidly connected to motor block carrier 2 while the inner steel sleeve 16 in a manner similar to that of FIG. 2, is rigidly connected to the chassis of the motor vehicle. In the embodiment according to FIG. 7, the substantial difference between this embodiment and that of FIG. 2 is that pump 4 is arranged in the supply chamber 7 instead of in the spring chamber 6. The outer steel sleeve 17, which is arranged coaxially to the inner steel sleeve 16, which encloses the whole elastomer insert 18, including the pump member 8, the pump piston 9 as well as the fluid chambers formed between the elastomer insert 18 and its radial inner wall, is curved somewhat radially to the inside at the axial ends in order to ensure a more dependable arrangement of the elastomer insert 18 in the outer steel sleeve 17. The elastomer insert 18 encloses a cage preferably made of steel, a light metal or an artificial material which tensions or stretches the elastomer insert 18 at least at the axial areas against the inside wall of the outer steel sleeve 17.

The cage for the elastomer insert 18 basically comprises two outer cage rings 56, which in the section according to FIG. 7, are connected at the area of the inner steel sleeve 16 by axially oriented connecting elements with the same radius as the outer cage rings 56. In addition to the outer cage rings 56, a further half-ring 57 is provided at the lower area of the cage, which is also rigidly connected to the two axial, outer connecting elements of the outer cage rings 56. Seen axially, the half-ring 57 is arranged preferably, at a subdivision of the axial distance between the two outer cage rings of $\frac{1}{3}:\frac{2}{3}$. In the larger intermediate compartment, which in the embodiment according to FIG. 7 is formed between the right outer cage ring 56 and the half-ring 57, the supply chamber 7 is assembled with parts of the pump member 8 and of the pump piston 9.

In a cross section the cage rings 56 and 57 present a relatively flat U-shaped profile radially directed to the outside. The pump member 8 is disposed on the inner steel sleeve 16. The pump member 8, as a rule, consists of artificial material or a light metal and is heat-shrunk onto the inner steel sleeve 16, with the exception of small opening areas. The pump member 8 has formed thereover the elastomer material in the same form as the whole cage so that the whole elastomer insert 18 is formed integrally with the cage and pump member 8 on the inside of steel sleeve 16. In the embodiment according to FIG. 7, the fastening or tensioning of the elastomer insert 18 by means of its cage rings 56 and 57 suffices to provide a solid, fluid-tight arrangement inside the outside steel sleeve 17.

The spring chamber 6 formed in the upper area of the spring device 3 above the inner steel sleeve 16 has, in principle, the form of a reversed U pointing to the axis. The inside area of this U is filled with the elastomer material that extends over the upper area of pump member 8. The outer areas of the reverse U of spring chamber 6 are formed by the membrane walls 22 and 23.

The shock-absorbing or cushioning chamber 19 is formed at the lower area of the spring device according to FIG. 7 in the smaller intermediate compartment between the left cage ring 56 and the half-ring 57. The shock-absorbing or cushioning chamber 19 is limited in the axial direction by the membrane walls 24 and 25 and radially outwardly by the inside wall of the outer steel sleeve 17. In the direction of the inner steel sleeve 16, the shock-absorbing or cushioning chamber 19 is in contact, over an opening in the elastomer insert, with a thereto aligned passage 20'. A complementary passage 20' is also provided on the upper section of the pump member 8 to correspond to lower passage 20' with a displacement of approximately 180°. The spring chamber 6 and the shock-absorbing or cushioning chamber 19 are in fluid connection through these passages 20' and corresponding openings in the elastomer through a ring or channel 20" that extends itself in the radial direction in the area of the passages 20'. Passages 20' and ring 20" together form a throttling channel.

The wall of the shock-absorbing or cushioning chamber 19, similarly to the outer membrane walls 22,23 are formed with a relatively large wall strength so that the acting forces do not only experience a fluid damping, but also a damping through the elastomer insert 18 itself. The purpose of the membrane walls 22,23,24 and 25 is to achieve, on alternating movements of the spring device, additional reduction and enlargement of the fluid chambers so that the difference in pressure is formed, not only by an over pressure in one of the fluid chambers, but also by an under pressure in the opposite chamber.

In FIG. 7 the lower part of pump member 8 bearing the pump piston 9 is disposed in the larger intermediate compartment between the right outer cage ring 56 and the half-ring 57. Viewed in the radial direction, meaning between the outer wall of the inside steel sleeve 16 and the inner wall of the outer steel sleeve 17, the pump member 8 extends approximately over ¾ of this distance. The part of the pump member 8 that bears the pump piston 9 is, in principle, formed as a hollow cylinder, protruding in substance perpendicularly downwardly from the flat axial area of pump member 8. Pump piston 9 is biased in this hollow cylinder 63 by a spring 33 that abuts the axial part of pump member 8 and, according to FIG. 7, the upper area of pump piston 9 engages the lower inner wall of the outer steel sleeve 17. In a manner similar to that illustrated in FIG. 4, the pump piston 9 has a cross slit 43 on the rounded off head area. The first connecting passage 10 is provided centrally, and the pump piston 9 is in contact with the pump compartment 46 itself over a first control valve 11 adjoining the connecting passage 10.

While the control valve 11 bearing a ball has its sealing valve seat directed towards the cross slit 43, nose-type protrusions 44 are provided in the upper area which on a suction pulse of pump piston 9 prevent closing of the control valve upwardly and a falling-out of the ball.

The pump piston 9 is arranged in the hollow cylinder of pump member 8 in a sealing and slidable manner. At about the middle of its vertical longitudinal length the pump piston 9 passes steppedly over into a cylindrical area which has a slightly smaller diameter than the area facing spring 33.

In the direction of the shock-absorbing chamber 19, the hollow cylinder 63 of pump member 8 joins a triangular part 61 with the axial flowing area of pump member 8. An oblique passage 15 is provided in the element 61, preferably at an angle of about 60° to the axis of the inner steel sleeve 16, which as a further connecting passage 15 allows fluid connection between the supply chamber 7, the shock-absorbing chamber 19 and the spring chamber 6. In the direction of the inner steel sleeve 16, this connecting passage 15 flows into the ring nut 20". In the direction of the pump piston 9, the connecting passages 15 flows over a longitudinal, oval, especially eliptical opening 60 through hollow cylinder 63 into the supply chamber 7.

The pump chamber 46 is connected through an opening 51 provided in the axial area of the pump member 8 to a ring 51 formed in the inner steel sleeve 16. Complementary to this opening 51, the upper part of the pump member 8 is also provided with an opening 52 which adjoins the control valve 13. The upper area of control valve 13 has approximately the same formation as the control valve 11, being provided with nose-type protrusions so that a fluid sealing occurs in an upward direction towards the spring chamber 6 and a falling-out is prevented. The upper area of the control valve 13 flows directly into spring chamber 6.

In the area of the supply chamber 7 and hollow cylinder 63, the elastomer insert 18 has a downward formation in the manner of an extension of the hollow cylinder. This extension terminates about the area of the cross slit 43, leaving open a split area towards the inner wall of the outer steel sleeve 17.

The overall function of the spring element in FIG. 7 corresponds to that described for FIGS. 1 and 2. The individual functions, for instance those of the control valves, are, however, different. Thus, if one considers a force F that acts perpendicularly to the axis of the inner steel sleeve 16 on the motor block carrier, this will cause a change in distance between the inner steel sleeve 16 and the outer steel sleeve 17 in the lower part of spring device 3. On the enlargement of this distance, as a consequence the pump piston 9 is biased by means of spring 46, to correspond to the changed distance between the two steel sleeves 16 and 17. This means initially a suction pulse, wherein, over cross slit 43 and the therewith communicating first connecting passage 10, when the control valve 11 is open, fluid is drawn into the pump chamber 46. On such a stroke of the pump piston downwardly, opening 60 of the connecting passage 15 is closed by the pump body. During the suction pulse, the ball of the control valve 11 comes into contact with the protrusions 44 so that the hydraulic fluid can flow into pump chamber 46. During the suction pulse, the second control valve 13 remains closed, meaning in its lower position.

At the start of the counter-movement in the form of a movement of the lower part of the outer steel sleeve 17 against the inner steel sleeve 16, the first control valve 11 is closed while the second control valve 13 is opened A part of the hydraulic fluid that is in the pump compartment 46 is pressed into the spring chamber 6 by the pump piston 9 over the openings 51 and 52 and the ring 50. There may exist a slight direct fluid connection between the spring chamber 6 and the dampening chamber 19 over ring 20" and the obliquely running connecting passage 15 with the supply chamber 7. By reason of the cross-section of the connecting passage 15 and the longitudinal oval opening 60, there is, however, achieved such a throttling effect that this direct fluid influence may be disregarded in the overall function of the spring device.

Figure 8:
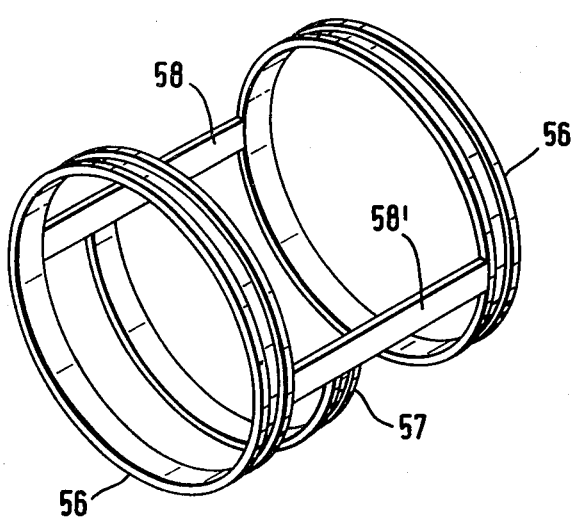
FIG. 8 is a perspective view of a cage as shown in the embodiment of FIG. 7.

As can be seen in FIG. 8 the cage comprises two outer cage rings 56 and a half-ring 57 axially inbetween rings 56. The rings 56 and the half-ring 57 are rigidly connected with each other by two outer connecting elements 58, 50', which are parallel to the axis of the outer steel sleeve 17.

What we claim is:

1. A self-activated load-independent level adjusting spring device for interconnecting two parts of a machine which are movable with respect to each other, comprising an outer metal sleeve rigidly connected to one of said parts, an inner metal sleeve rigidly connected to the other of said parts, said inner sleeve being generally disposed within said outer sleeve to provide a space between said inner sleeve and said outer sleeve, an elastomer member disposed in said space between said inner and outer sleeves, a pump means having a pump chamber provided in a pump housing and a piston therein, said pump housing being connected to one of said sleeves, said piston being operable in said pump chamber and being engageable with the other of said sleeves such that the relative position of said piston in said pump chamber corresponds to the relative radial position between said inner and outer sleeves and thus to the relative position between said two parts, spring chamber means at least partially defined by said elastomer member for containing a hydraulic fluid, said spring chamber means being disposed between said inner and outer sleeves, supply chamber means at least partially defined by said elastomer member for containing a hydraulic fluid supply, said supply chamber means being disposed between said inner and outer sleeves, a first passageway connected between said pump chamber and said supply chamber means, a first control valve in said first passageway opening upon the suction stroke of said pump, a second passageway connected between said pump chamber and said spring chamber means, and a second control valve in said second passageway opening upon the pressure stroke of said pump, a third passgeway between said pump chamber and said supply chamber means, said third passageway leading to a first opening in said pump chamber, said first opening being at a position to be covered and uncovered by said piston depending on the position of said piston in said pump chamber whereby the passage of fluid through said third passageway is controlled by the position of said piston in said pump chamber, a fourth passageway between said pump chamber and said spring chamber means, said fourth passageway leading to a second opening in said pump chamber, said second opening being at a position to be covered and uncovered by said piston depending on the position of said piston in said pump chamber, whereby said pump means is actuated upon relative movement between said two parts to effect a pumping action of pressure and suction pulses between said supply chamber means and said spring chamber means via said first and second passageways to thereby provide load-independent, level regulation between said two parts, and whereby in the uncovered position of said first and second openings, the fluid pressure within said spring chamber means is decreased through a by-pass connection to said supply chamber means via said third and fourth passageways.

2. A device according to claim 1 further comprising a buffering chamber means defined at least partially by said elastomer member, said buffering chamber means being disposed between said inner and outer sleeves, and throttling means connecting said spring chamber means with said buffering chamber means.

3. A device according to claim 1, wherein said second opening is located relative to said first opening such that at least a part of said first opening is uncovered by said piston before any part of said second opening is uncovered by said piston.

4. A device according to claim 1, wherein said piston is axially slideable in said pump chamber, and further comprising biasing means biasing said piston into engagement with said other of said sleeves.

5. A device according to claim 1, wherein said pump means is disposed within said spring chamber means.

6. A device according to claim 5, wherein said second passageway and said second control valve are disposed in said piston.

7. A device according to claim 1, wherein said spring chamber means and said supply chamber means are disposed about a longitudinal axis in the form of an elastomer bellows formed by said elastomer member and having inner and outer peripheral portions, said inner and outer peripheral portions being attached to said inner and outer sleeves respectively.

8. A device according to claim 1 wherein said two relatively movable parts are connected to provide suspension of a driving mechanism within a motor vehicle.

9. A self-activated load-independent level adjusting spring device for interconnecting two parts of a machine which are movable with respect to each other, comprising an outer metal sleeve rigidly connected to one of said parts, an inner metal sleeve rigidly connected to the other of said parts, said inner sleeve being generally disposed within said outer sleeve to provide a space between said inner sleeve and said other sleeve, an elastomer member disposed in said space between said inner and outer sleeves, a pump means having a pump chamber provided in a pump housing and a piston therein, said pump housing being connected to one of said sleeves, said piston being operable in said pump chamber and being engageable with the other of said sleeves such that the relative position of said piston in said pump chamber corresponds to the relative position between said inner and outer sleeves and thus to the relative position between said two parts, spring chamber means at least partially defined by said elastomer member for containing a hydraulic fluid, said spring chamber means being disposed between said inner and outer sleeves, supply chamber means at least partially defined by said elastomer member for containing a hydraulic fluid supply, said supply chamber means being disposed between said inner and outer sleeves, a first passageway connected between said pump chamber and said supply chamber means, a first control valve in said first passageway opening upon the suction stroke of said pump, a second passageway connected between said pump chamber and said spring chamber means, a second control valve in said second passageway opening upon the pressure stroke of said pump, a further passageway providing for a bypass-connection between said spring chamber means and said supply chamber means leading to an opening in said pump chamber at a position to be covered and uncovered by said piston depending on the position of said piston in said pump chamber, whereby said pump means is actuated relative movement between said two parts to effect a pumping action of pressure and suction pulses between said supply chamber means and said spring chamber means via said first and second passageways to thereby provide load-independent, level regulation between said two parts and whereby in the uncovered position of said opening, the fluid pressure within the spring chamber means is decreased through said bypass-connection to said supply chamber means via said opening.

10. A device according to claim 9, wherein said pump means is disposed in said supply chamber means.

11. A device according to claim 10, wherein said pump chamber comprises a housing in which said piston is operable, said first passageway and said first control valve being disposed in said piston, said further passageway being obliquely disposed in said housing and extending to said opening which is closed by said piston on the suction pulse of said pump means.

12. A device according to claim 9, wherein said spring chamber means, said supply chamber means, and said buffering chamber means are disposed about a longitudinal axis in the form of an elastomer bellows formed by said elastomer member and having inner and outer peripheral portions, said inner and outer peripheral portions being attached to said inner and outer sleeves respectively.

* * * * *